(12) United States Patent
Corti et al.

(10) Patent No.: US 9,391,874 B2
(45) Date of Patent: Jul. 12, 2016

(54) RE-ROUTING TRAFFIC IN A COMMUNICATIONS NETWORK

(75) Inventors: Andrea Corti, Varazze (IT); Raoul Fiorone, Genoa (IT); Riccardo Martinotti, Savona (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 597 days.

(21) Appl. No.: 12/992,269

(22) PCT Filed: Jul. 8, 2008

(86) PCT No.: PCT/EP2008/058844
§ 371 (c)(1),
(2), (4) Date: Aug. 1, 2011

(87) PCT Pub. No.: WO2009/138133
PCT Pub. Date: Nov. 19, 2009

(65) Prior Publication Data
US 2012/0020207 A1    Jan. 26, 2012

(51) Int. Cl.
*H04L 12/707* (2013.01)
*H04L 12/751* (2013.01)
*H04L 12/703* (2013.01)
*H04L 12/753* (2013.01)

(52) U.S. Cl.
CPC .............. *H04L 45/22* (2013.01); *H04L 45/02* (2013.01); *H04L 45/28* (2013.01); *H04L 45/48* (2013.01)

(58) Field of Classification Search
CPC ...................................................... H04L 45/48
USPC ............................ 370/225; 709/223, 239, 252
See application file for complete search history.

(56) References Cited

U.S. PATENT DOCUMENTS

| | | | |
|---|---|---|---|
| 6,115,753 A | 9/2000 | Joens | |
| 6,947,376 B1 * | 9/2005 | Deng et al. | 370/219 |
| 7,457,233 B1 * | 11/2008 | Gan et al. | 370/216 |
| 7,804,767 B1 * | 9/2010 | Owens | H04L 45/00 370/217 |
| 2002/0112072 A1 * | 8/2002 | Jain | 709/239 |
| 2003/0005149 A1 * | 1/2003 | Haas | H04L 12/1854 709/238 |
| 2003/0063613 A1 * | 4/2003 | Carpini et al. | 370/216 |
| 2004/0233882 A1 * | 11/2004 | Park et al. | 370/338 |
| 2005/0086469 A1 * | 4/2005 | Dunagan | H04L 12/1854 713/163 |
| 2005/0117526 A1 * | 6/2005 | Melnik | H04L 45/00 370/254 |

(Continued)

FOREIGN PATENT DOCUMENTS

| | | |
|---|---|---|
| CN | 1541466 A | 10/2004 |
| CN | 1708032 A | 12/2005 |

(Continued)

OTHER PUBLICATIONS

Yvan Pointurier "Link Failure Recovery for MPLS Networks with Multicasting" Matser thesis 2002.*

(Continued)

*Primary Examiner* — Kodzovi Acolatse

(57) ABSTRACT

Method of re-routing traffic in a communications network (1) in the event of a fault (3) on a path across the network, the method comprising, determining whether a first node (4), located between the fault and a network ingress node (6), is capable of switching traffic to an alternative path which avoids the fault, and if the first node is determined to be not so capable, then determining whether a second node (8), located upstream of the first node, is capable of switching traffic to an alternative path which avoids the fault.

18 Claims, 5 Drawing Sheets

(56) References Cited

U.S. PATENT DOCUMENTS

| | | |
|---|---|---|
| 2005/0188108 A1* | 8/2005 | Carter et al. ............... 709/239 |
| 2005/0281192 A1* | 12/2005 | Nadeau et al. ............. 370/217 |
| 2006/0002370 A1* | 1/2006 | Rabie et al. ................ 370/351 |
| 2006/0159009 A1* | 7/2006 | Kim .................. H04L 12/18 370/216 |
| 2006/0268688 A1 | 11/2006 | Isozu |
| 2007/0263592 A1* | 11/2007 | Agarwal et al. ............ 370/351 |
| 2008/0095045 A1* | 4/2008 | Owens et al. .............. 370/220 |
| 2008/0095047 A1* | 4/2008 | Skalecki et al. ............ 370/225 |
| 2009/0175176 A1* | 7/2009 | Mohan ....................... 370/244 |
| 2009/0190478 A1* | 7/2009 | Li et al. ...................... 370/238 |
| 2009/0252033 A1* | 10/2009 | Ramakrishnan et al. .. 370/228 |
| 2010/0017511 A1* | 1/2010 | Kim et al. .................. 709/225 |
| 2011/0080854 A1* | 4/2011 | Farkas et al. ............... 370/256 |

FOREIGN PATENT DOCUMENTS

| | | |
|---|---|---|
| CN | 1781290 A | 5/2006 |
| EP | 0 859 491 | 8/1998 |
| EP | 1 608 111 | 12/2005 |
| WO | WO 03/005629 | 1/2003 |

OTHER PUBLICATIONS

International Search Report for PCT/EP2008/058844, mailed Aug. 21, 2008.

Chinese Search Report dated Sep. 18, 2013 in Chinese Application No. 200880130403.0.

* cited by examiner

Protection sub-tree

Protection sub-tree

Protection sub-tree

RE-ROUTING TRAFFIC IN A COMMUNICATIONS NETWORK

This application is the U.S. national phase of International Application No. PCT/EP2008/058844, filed 8 Jul. 2008, which designated the U.S. and claims priority to EP Application No. 08156047.6, filed 12 May 2008, the entire contents of each of which are hereby incorporated by reference.

TECHNICAL FIELD

The present invention relates generally to re-routing traffic in a communications network.

BACKGROUND

Despite the publicity on multimedia services which require a point-to-multipoint connectivity, like television streams multicast over Internet Protocol (IPTV), the support of E-Tree services is a recent event in Connection Oriented-Packet Switched (CO-PS) networks, like Multi Protocol Label Switching (MPLS), Transport MPLS (T-MPLS) or Provider Backbone Bridging Engineering (PBB-TE). The debate is still open on how to efficiently support E-Tree services and provide the required network resiliency in CO-PS networks. Some doubt has been instilled that CO-PS networks are not really as good as Connectionless-Packet Switched (CL-PS) networks for such services. Currently, no finalized standard solution exists.

Existing connectionless options like Ethernet-based networks (e.g. Provider Bridge or Provider Backbone Bridge) still rely on very basic control plane solutions for both loop avoidance and resiliency, like the few variants of the Spanning Tree Protocol. Along with their limited capability to implement sophisticated traffic engineering, this is one of the reasons why the move towards CO-PS networks is ineluctably taking place, forcing the standard making bodies and the technical community to face the issues related to the efficient support of E-Tree services.

Ultimately, solutions which completely rely on Layer 3 of the Open Systems Interconnection (OSI) Basic Reference Model (i.e. the IP layer) are unsuitable, cost inefficient and of inappropriate complexity, especially in relation to metropolitan networks.

Standard-making bodies are currently working on a definition of a proper network infrastructure to support E-Tree services with the required degree of efficiency. No complete interoperable solution has been finalized so far for point-to-multipoint infrastructures, but there have been several attempts to solve this problem in CO-PS networks. The most efficient solutions make use of tree infrastructures built in the CO-PS network that connect an ingress or root node (which is a node where the E-Tree service enters the network/sub-network) to the several egress nodes (which are the destinations of the E-Tree service), with the aim of optimizing the overall use of network resources. Extensive literature is available on how to build an optimum tree for a particular network topology and possible constraints. In addition, resiliency is a basic requirement for this kind of service, because revenue generating applications, like IPTV, cannot be delivered to paying customers with poor quality or unacceptable interruptions. This tree infrastructure therefore needs to be protected against link or node failures, possibly in a non-traffic consuming way, like in 1:1 or restoration schemes, where the traffic is sent onto a backup path when the primary path has failed.

A few known solutions address this requirement, with local repair schemes, like Fast ReRoute (FRR) in MPLS, or with global repair schemes whose operation consist in providing a complete backup tree. A limitation of local repair schemes is that in the case of node failure the tree infrastructure needs to be locally modified, because some other node in the network needs to forward the traffic in a different way to make up for the failed node and ensure the E-Tree service traffic continuity. This can be difficult to implement, require a very high degree of complexity and result in a longer recovery time. In addition, traffic duplication is possible during fault conditions. Besides the need to actually configure a potentially very high number of alternative paths in order to avoid issues with single points of failure, the main limitation of FRR lies in its necessarily local repair nature, which is not particularly well suited for a potentially non-trivial tree infrastructure.

In the case of global repair schemes, irrespective of where and what the fault condition is in the active tree infrastructure, all of the traffic related to the E-Tree service is switched to the backup tree. This can be particularly problematic for the egress nodes, since even though the switching time is kept to a minimum, all such nodes will see an impact on the traffic, even those which are remote from where the fault has occurred. To add further complexity to such a scenario, E-Tree specific control plane protocols, like for instance IGMP in case of IPTV, can experience difficulties and may need to recover updated information on the backup tree before allowing the traffic to be forwarded normally again. This can lead to an even longer time for the protection scheme to finally converge and return to normal operation.

SUMMARY

According to one aspect of the invention there is provided a method of re-routing traffic in a communications network in the event of a fault on a path across the network. The method comprises, determining whether a first node, located between the fault and a network ingress node, is capable of switching traffic to an alternative path which avoids the fault. If the first node is determined to be not so capable, then determining whether a second node, located upstream of the first node, is capable of switching traffic to an alternative path which avoids the fault.

According to another aspect of the invention there is provided a communications network comprising a plurality of nodes which are connected by respective links to form a path for traffic across the network. The nodes comprising at least one re-routing node configured to determine that a fault has occurred between the re-routing node and a network egress node, and the re-routing node configured to determine if it is able to switch traffic onto an alternative path to avoid the fault. If it is not so able then the re-routing node configured to cause a fault notification signal to be sent to an upstream node, and the upstream node configured to determine if it is able to switch traffic to an alternative path to avoid the fault.

According to a further aspect of the invention there is provided a node for use in a communications network. The node comprises a processor configured to determine that a fault in the network has occurred and configured to determine whether it is capable causing traffic to be switched to an alternative path. In the event that the processor determines that it is not so capable, the processor configured to cause a fault notification signal to be transmitted for reception by a second node.

According to yet a further aspect of the invention there is provided a method of configuring a communications network to provide at least one alternative path in the event that a fault occurs in a path across the network. The method comprises configuring at least one re-routing node of the network to determine that the fault has occurred, and configuring the at least one node to determine whether it is able to switch the traffic to an alternative path to avoid the fault. The method also comprises configuring the node such that if the node determines that it is not so able then the node issues a fault notification signal to another node.

According to another aspect of the invention there is provided machine-readable instructions to configure a node, the instructions comprising instructions to cause a processor of the node to determine that a fault has occurred in a communications network in which the node is to be located, instructions to cause a processor to determine whether the node is capable of providing a switch to divert traffic onto an alternative path to avoid the fault, and instructions to cause the processor to bring about the node issuing a fault notification signal if the node is determined not to be so capable

DESCRIPTION OF THE DRAWINGS

Various embodiments of the invention will now be described, by way of example only, in which.

DETAILED DESCRIPTION

Figure 1:
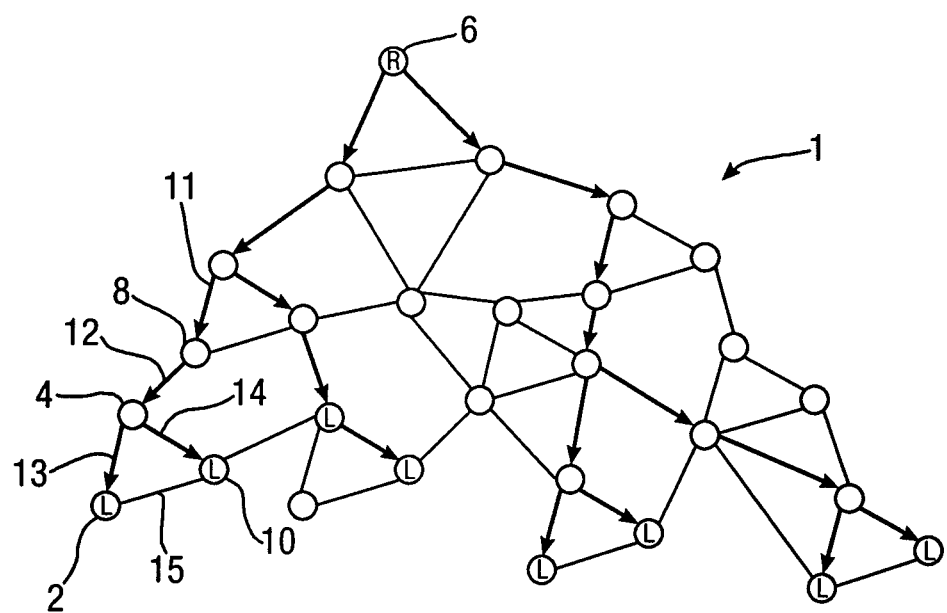
FIGS. 1 to 4 show a communications network.
Figure 1A:
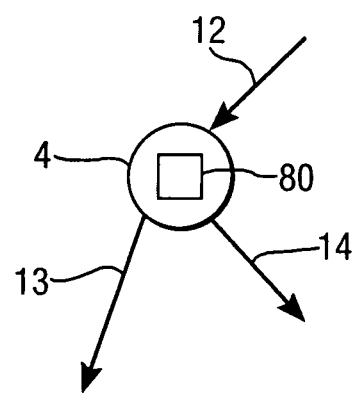
FIG. 1a is a communications network node.

A network 1, which is configured to implement an embodiment of the present invention, is shown in FIG. 1. The network 1 comprises a meshed network and a tree structure has been identified and configured. Broadly, the network 1 comprises a plurality of nodes, shown as circular elements, and links providing communication between the nodes, the links shown by lines connecting the nodes. A root node, which is the node responsible for the distribution of an E-tree service within the network 1, and may be termed a network ingress node is designated by the letter "R". The network 1 further comprises a plurality of leaf or egress nodes, which are the nodes attached to the destinations of the E-tree service, and are each designated by the letter "L". Each node of the network comprises a processor configured to cause received traffic to be forwarded as required. For example, a node 4 comprises a processor 80, as shown in FIG. 1a.

The network 1 provides an active tree structure to support the E-tree service and an associated stand-by tree structure. The stand-by tree structure is arranged to be used in what may be termed as a "fractal" manner. This means that a type of hierarchy in the active tree is created such that there is the possibility to identify sub-trees which can react autonomously to fault conditions without needing the fault condition to be notified to the root node of the whole tree in order to switch all the traffic related to the E-tree service onto a stand-by tree. The active tree structure and the stand-by tree structure (both comprising of a number of sub-trees) are identified at the time of configuring the network or when the service which needs to be supported has to be rolled-out. Path diversity between the active and the stand-by tree structures and sub-tree structure have to be configured in order to limit to a minimum number, or indeed eliminate, single points of failure. Two logically disjoint trees can always be identified, each composed of a number of sub-trees. As will described below, in the case of fault, the tree is "repaired" as close as possible to the fault itself, performing a protection switch operation only at the most appropriate sub-tree level, if any, and not necessarily at the whole-tree level (which will occur only when no sub-tree is able to deal with the specific fault). In this way the traffic impact is confined only to the minimum and unavoidable number of leaf nodes, and not necessarily to the complete tree.

FIG. 1 shows the network 1 in normal working conditions. A tree, the links of which are shown by emboldened arrows, provided by the network, comprises two main portions. These are a left sub-tree portion and right sub-tree portion, as can easily be seen in FIG. 1. As will be described below, some of the nodes of the tree are configured as re-routing nodes to route traffic to an alternative path to avoid a fault.

Figure 2:
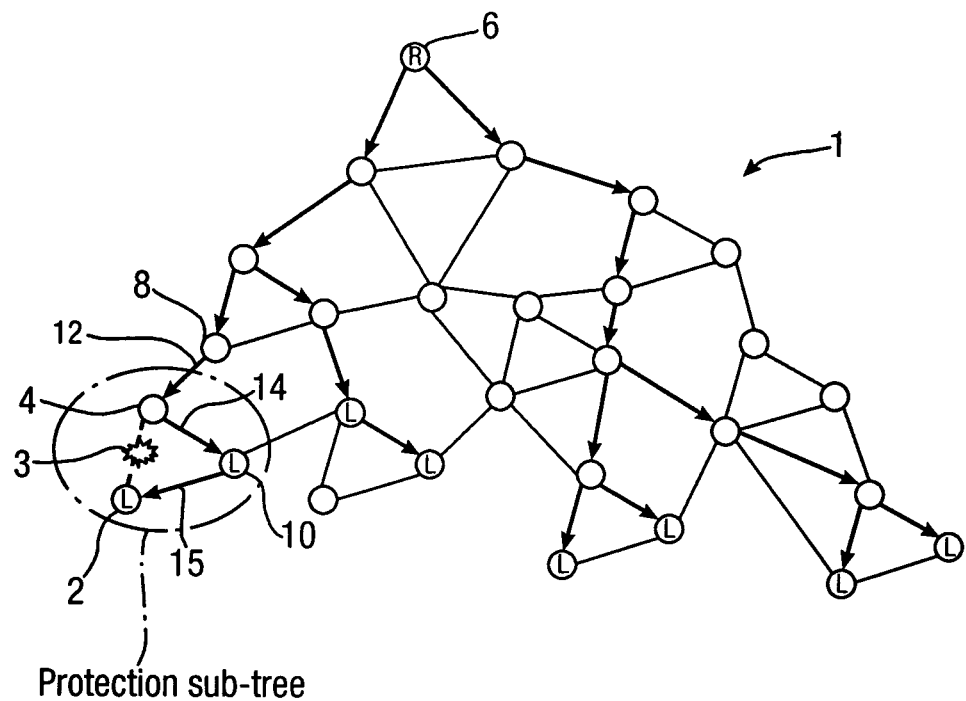

In FIG. 2 a fault condition, shown at 3, has occurred in the network 1, to a link 13 attached to a leaf node 2. This part of the tree has been configured as a sub-tree, since, due to the physical topology of the network 1, is capable of autonomously recovering from a range of faults, included the fault 3 shown in FIG. 2. A node 4 serves as a re-routing node, which is the node responsible for switching the traffic from an active sub-tree (i.e. the one used in normal operating conditions) to a stand-by sub-tree, and can be termed the root of that particular sub-tree. A re-routing node is a node that has been configured to be able to switch to a stand-by alternative path (i.e. a sub-tree) whenever the node detects a downstream fault or it is notified by a downstream node about a fault event. The node's responsibilities include filtering out fault notifications which are conveyed upstream of the tree (i.e. towards the root node 6, and between the fault and the node 6) in all those cases in which that node can itself perform the switch to divert the traffic to alternative path away from the downstream fault. In this way reaction to dealing with the fault can be kept as local as possible to the fault, and no other (upstream) node which is not directly involved in the switch operation will know anything about the fault.

On determining that a downstream fault has occurred, the re-routing node 4 switches traffic destined for the leaf node 2, to be sent over link 14 to a leaf node 10, and the leaf node 10 causes the traffic to be sent over link 15 to the leaf node 2.

As a consequence of the sub-tree switch performed by the node 4, the entire tree has not needed to have been made aware of the fault, and all the nodes of the tree, except the three nodes, 2, 4 and 10, in the circle shown as 'the protection sub-tree', have seen no increase in the E-tree traffic.

Figure 3:
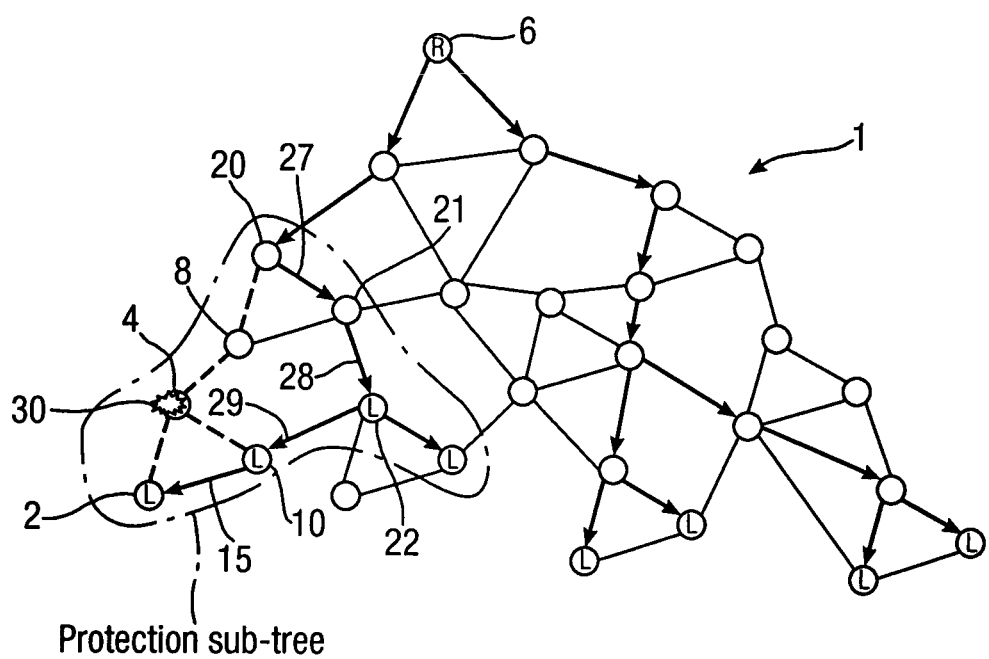

In FIG. 3 a different fault condition has occurred. In this case, it is a fault of the node 4, shown at 30. The stand-by sub-tree which was able to react to and recover from the fault in FIG. 2, is unable to cope with this fault condition, and therefore resolving the problem must be effected closer to the root node 6 of the complete tree. This is equivalent to say that a larger sub-tree, which comprises the sub-tree mentioned in FIG. 2, has to take action to recover from the fault. The re-routing node 20 indicated in FIG. 3, which may be termed the root node of the larger sub-tree, is notified and is operative to switch the traffic to the relevant stand by sub-tree. The re-routing node 20 determines that a fault has occurred by way of a fault notification signal being sent over the link 11 from the node 8, which is aware of the fault. It is to be noted here that node 8 is not a re-routing node and so the node 8 is operative to forward the fault signal to the upstream node, node 20. On receiving the signal, the node 20 is configured to switch received traffic across a link 27 to a node 21, the node 21 is configured to send the traffic across the link 28 to the node 22, the node 22 is configured to send the traffic across the link 29 to the node 10 and the node 10 is configured to send the traffic across the link 15 to the leaf node 2.

Figure 4:
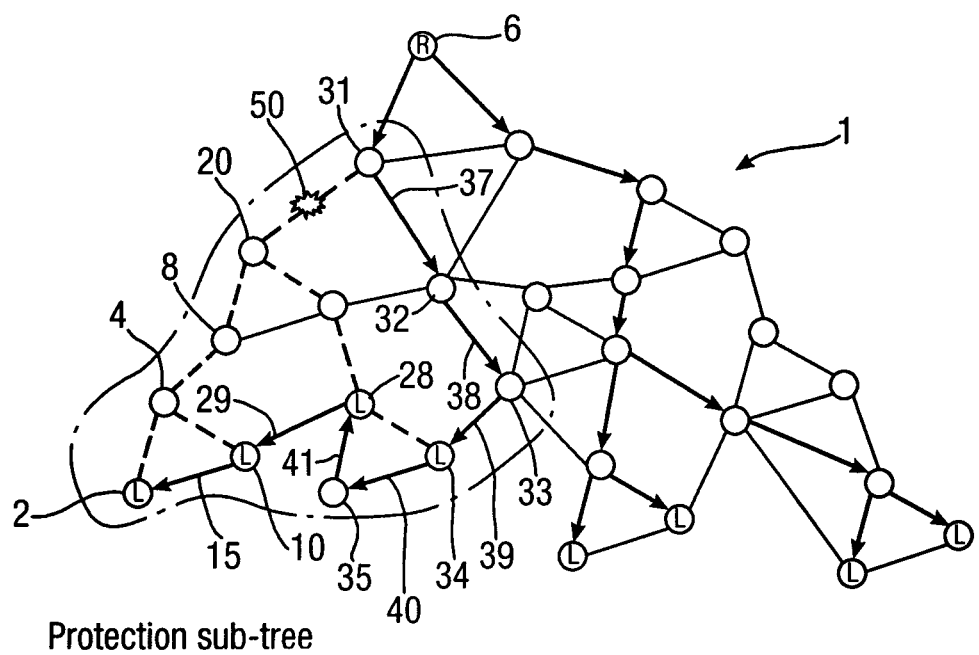

A further fault condition is shown in FIG. 4. Compared to the fault conditions described above, the fault occurs closer to the root node 6 of the complete tree, and the sub-tree shown in FIG. 3 is not able to deal with it. It should be clear that a larger sub-tree, if available, has to react to this fault, as indicated in FIG. 4. The fault, shown at 50, has occurred in a link 36 connecting nodes 20 and 31. On determining that a fault has occurred, the (re-routing) node 31 is configured to switch traffic onto an alternative path to reach the leaf node 2. As is shown in FIG. 4 the alternative path comprises nodes 32, 33, 34, 35, 28 and 10 and the links 37, 38, 39, 40, 41, 29 and 15. It should be clear that a larger sub-tree, if available, has to react to this failure, as indicated in FIG. 4.

In case no sub-tree can be effective to recover from a fault condition, the whole tree may be involved in the protection switch, and in that situation the root node 6 of the complete tree performs the necessary switch to divert the traffic onto an alternative path.

It will also be appreciated that all the fault conditions which have been discussed above have no impact on the leaf nodes on the right end side part of the complete tree.

It will be appreciated that those nodes which are involved in providing an alternative path are suitably configured in an initial set-up procedure so that diverted traffic arriving at those nodes is sent to the next node of the alternative path. This may be achieved in an initial set-up procedure by suitably configuring forwarding tables of each of the nodes.

In the above described three fault conditions, three re-routing nodes, 4, 20 and 31 at different levels in the tree infrastructure have been mentioned. Each of those nodes corresponds to what may be termed as a respective sub-root node of three protected sub-trees (i.e. each sub-tree comprises an active and a stand-by tree), and plays a special role in providing an alternative path.

The re-routing nodes are responsible for two possible courses of action:
  to provide fault recovery by way of a switch operation, with no further notification signal towards upstream nodes
or
  to delegate protection to an upper sub-tree by sending a fault notification signal.

It is to be noted that the fault notification signal is conveyed upstream of the tree, because this allows an effective realization of the method of re-routing. Provided that the re-routing nodes are not in a fault condition, they are responsible for determining whether a fault notification signal which they receive in response to a fault condition (however they may also, or alternatively, detect a fault condition directly) can be locally repaired, by switching the traffic onto a stand-by sub-tree, of which they are the root, or whether, instead, they need to forward a fail notification signal to an upper layer of the tree, which can be a larger sub-tree (which includes their own sub-tree) or the complete tree.

Fault notification signals can conveniently be implemented using known techniques, such as Operation Administration and Maintenance (OAM) packets or Control Plane protocols (also depending on the actual technology which has been used for the CO-PS network) or by a proprietary message set.

Figure 5:
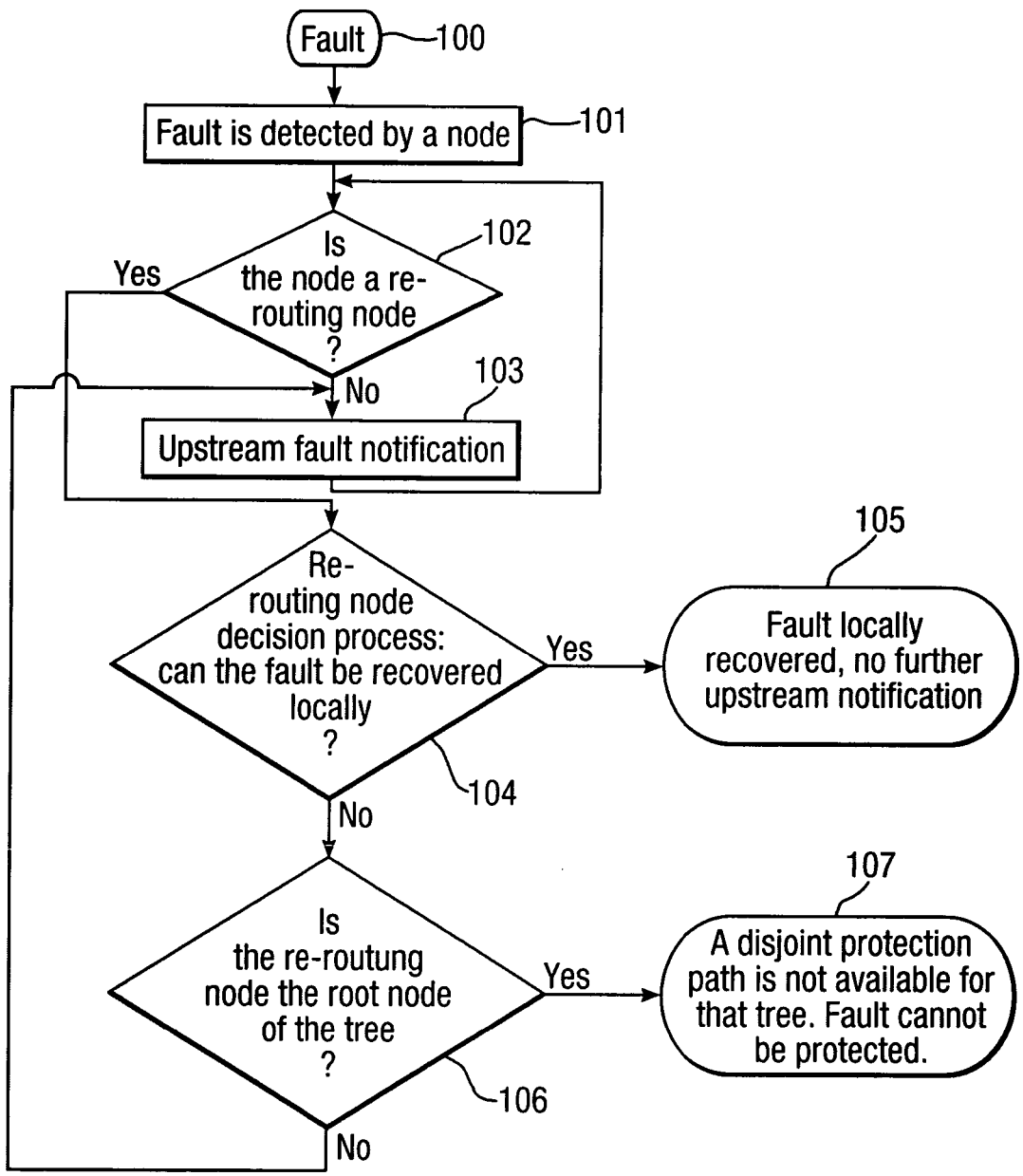
FIG. 5 is a flow diagram.

FIG. 5 is a flow diagram showing the overall re-routing method effected by the network 1. At 100, a fault has occurred in the network. At step 101, the fault is detected by a node. If the node is a re-routing node then the procedure proceeds to step 104. If the node is not a re-routing node then, as shown at step 103, a fault notification signal is sent upstream. At the point at which a re-routing node is reached, as shown at step 104, the node determines whether it can recover the fault by a switching the traffic to an alternative path. If it can, then, as shown at step 105, a switch operation is effected (so as to recover the fault), and no fault notification signal is sent upstream to another node. If, however, the re-routing node is unable to recover the fault, then at step 106 it is determined whether the node is in fact the root node of the tree. If that node is the root node, then a disjoint protection path is not available. If the node is not the root node then the procedure returns to step 103.

Figure 6:
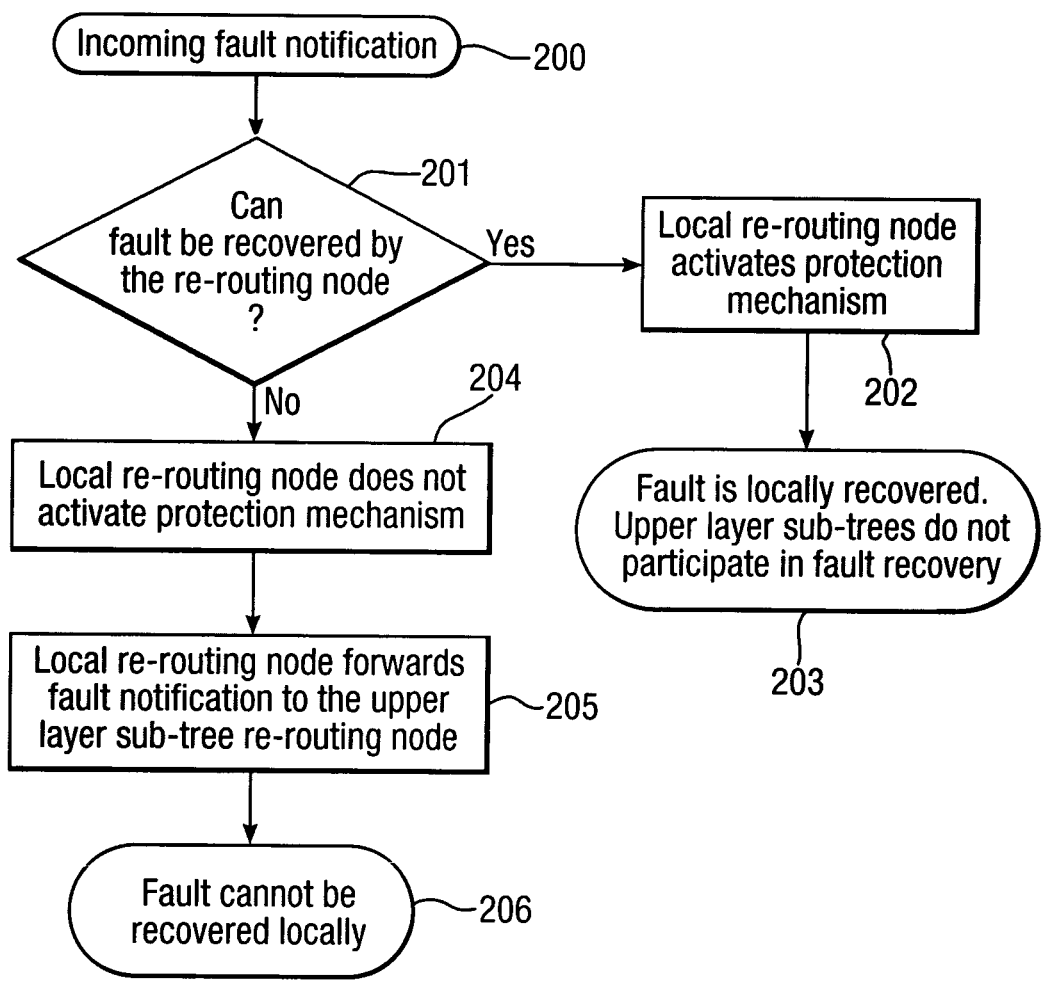
FIG. 6 is a flow diagram.

FIG. 6 is a flow diagram of the steps taken by a re-routing node. At 200, a fault notification signal is sent by a downstream node to the re-routing node. On receipt of the signal, step 201 requires that the re-routing node determines whether the node is able to recover the fault by switching the traffic to alternative path. If the re-routing node determines that it is so able, then the node performs the step 202 to divert the traffic to an alternative path. This results in the outcome 203. If the re-routing node determines that it is not so able, then as shown at steps 204 and 205, the node does not perform a switch operation to divert the traffic to an alternative path, rather it sends a fault notification signal to an upstream node. From the re-routing node's perspective this results in the outcome 206. It is to be noted that a reason why a re-routing node may not be able to switch traffic onto an alternative path is that a link, which forms part of a stand-by tree connected to the node may be faulty or another node at the opposite end of that link may be faulty. In that scenario an upstream re-routing node would be sought, in accordance with the steps shown in FIG. 5. It will be appreciated that that re-routing nodes can be suitably configured by way of machine-readable instructions, whether in the form of a signal, a data structure or a software product.

There are numerous advantages to the network 1. Fault recovery is capable of being performed by each sub-tree close to the failure point, so that only the minimum number of components of the network are affected by the re-routing method. In the case of a failure affecting a node or a portion of the tree where protection locally would require high complexity, fault recovery is "scaled" to an upper level sub-tree where the fault can be simply bypassed by an alternative path. This may be viewed as a tree infrastructure composed of a set of sub-trees hierarchically organized. The desired behavior can be deterministically achieved because the re-routing nodes are configured to react to a failure in a pre-determined 1:1 fashion, i.e. in the case of fault traffic is switched from an active sub-tree to a stand-by sub-tree.

In this way, by suitably configuring the protected tree and the protected sub-trees, thanks to the re-routing method, traffic disturbances to an E-tree service due to a fault are minimized and confined locally as far as is possible (or as locally as it is considered beneficial by a network operator). Given that every standby sub-tree is configured prior to any fault condition, a switch operation to divert the traffic to an alternative path can take place very quickly. This is particularly advantageous over known local repair schemes which require a node to be re-configured 'on the fly' when a fault occurs. Advantageously, the re-routing method performed by the network 1 is not limited to any particular connection orientated technology.

Path protection provided by the re-routing method in the network 1 is advantageously not limited in its application to any specific connection-oriented technology.

It is to be noted that even in the case of single points of failure, due to physical topology constraints active and standby trees and sub-trees remain logically separate, so that there is no risk of erroneous forwarding of the traffic.

It will be appreciated that although the above network implements a multicast solution, the method of re-routing traffic implemented by the network 1 is also applicable to unicast scenarios.

The invention claimed is:

1. A method of re-routing traffic in a communications network operating in a hierarchical tree structure where the network traffic is sent from an ingress node to a plurality of egress nodes, wherein the ingress node is a root node of the tree structure and the egress nodes are leaf nodes of the tree structure, and wherein in the event of a fault on a path across the network, the method comprising:
   determining, by a first node located between the fault and the ingress node, whether the first node is capable of autonomously switching traffic to an alternative sub-tree;
   as a consequence of the first node determining that the first node is unable to switch traffic to an alternative sub-tree, sending, by the first node, a fault notification signal upstream to a second node located upstream of the first node, wherein the second node is not the ingress node;
   as a consequence of the first node determining that the first node is able to switch traffic to an alternative sub-tree, determining whether the first node is capable of switching traffic from an initial sub-tree to an alternative sub-tree which avoids the fault; and
   as a consequence of the first node is determining that the first node is not capable of switching traffic to an alternative sub-tree which avoids the fault, sending, by the first node, a fault notification signal upstream to the second node, and autonomously determining whether the second node is capable of switching traffic to an alternative sub-tree which avoids the fault,
   wherein the communications network is configured to provide an E-tree service to at least part of the nodes of the communications network, wherein the ingress node is a node responsible for distribution of the E-tree service within the communications network and the egress nodes are nodes attached to destinations of the E-tree service.

2. The method as claimed in claim 1, wherein at least one further node determines whether the at least one further node is capable of switching the traffic to an alternative sub-tree in the event that the second node determines that the second node is not so capable.

3. The method as claimed in claim 1, wherein the first node neighbors the fault.

4. The method as claimed in claim 1, wherein the first node determines that the fault has occurred.

5. The method as claimed in claim 1, wherein the second node neighbors the first node.

6. The method as claimed in claim 1, wherein if the first node determines that the first node is able to switch traffic to an alternative sub-tree, then the fault notification signal is not sent to the second node.

7. The method of claim 1, wherein switching traffic to an alternative sub-tree which avoids the fault comprises switching traffic destined for a first leaf node to be sent over a first link to a second leaf node, which in turn causes the traffic to be sent over a second link to the first leaf node.

8. The method of claim 1, wherein each of the first and second nodes comprises a sub-root node of a protected sub-tree.

9. The method of claim 1, wherein each of the egress nodes is attached to a corresponding destination of an E-tree service.

10. A communications network operating in a hierarchical tree structure where the network traffic is sent from an ingress node to a plurality of egress nodes, wherein the ingress node is a root node of the tree structure and the egress nodes are leaf nodes of the tree structure, the communications network comprising:
   a plurality of nodes which are connected by respective links to form a tree for traffic across the network, the nodes comprising at least one re-routing node configured to:
   determine that a fault has occurred between the re-routing node and a network egress node,
   determine if the re-routing node is able to autonomously switch traffic onto an alternative sub-tree,
   send a fault notification signal upstream to an upstream node located upstream of the re-routing node as a consequence of the re-routing node determining that the re-routing node is unable to switch traffic to an alternative sub-tree, wherein the upstream node is not the ingress node;
   determine whether the re-routing node is capable of switching traffic to an alternative sub-tree which avoids the fault as a consequence of the re-routing node determining that the re-routing node is able to switch traffic to an alternative sub-tree;
   send a fault notification signal upstream to the upstream node as a consequence of determining that the re-routing node is not capable of switching traffic to an alternative sub-tree which avoids the fault, and
   autonomously determine whether the upstream node is capable of switching traffic to an alternative sub-tree which avoids the fault,
   wherein the communications network is configured to provide an E-tree service to at least part of the nodes of the communications network, wherein the ingress node is a node responsible for distribution of the E-tree service within the communications network and the egress nodes are nodes attached to destinations of the E-tree service.

11. The communications network as claimed in claim 10, wherein the at least one re-routing node is configured to switch traffic to at least one alternative subtree.

12. The communications network as claimed in claim 10, wherein the at least one re-routing node is connected to at least three links.

13. The communications network as claimed in claim 10, wherein if the at least one re-routing node determines that the re-routing node is able to switch traffic to an alternative sub-tree, then the re-routing node is configured not to send a fault notification signal is not sent to the second node.

14. The communications network as claimed in claim 10, wherein the communications network is a connection-orientated network.

15. The communications network of claim 10, wherein switching traffic to an alternative sub-tree which avoids the fault comprises switching traffic destined for a first leaf node to be sent over a first link to a second leaf node, which in turn causes the traffic to be sent over a second link to the first leaf node.

16. A first node for use in a communications network operating in a hierarchical tree structure where the network traffic is sent from an ingress node to a plurality of egress nodes, wherein the ingress node is a root node of the tree structure and the egress nodes are leaf nodes of the tree structure, the node comprising:
   a plurality of hardware interfaces and a processor collectively configured to:
   determine that a fault in the network has occurred;
   determine whether the first node is capable of causing traffic to be autonomously switched to an alternative sub-tree,
   send a fault notification signal upstream to an upstream node located upstream of the first node as a consequence of determining that the first node is unable to switch traffic to an alternative sub-tree, wherein the upstream node is not the ingress node;

determine whether the first node is capable of switching traffic to an alternative sub-tree which avoids the fault as a consequence of determining that the first node is able to switch traffic to an alternative sub-tree;

send a fault notification signal upstream to the upstream node as a consequence of determining that the first node is not capable of switching traffic to an alternative sub-tree which avoids the fault, and autonomously determine whether the upstream node is capable of switching traffic to an alternative sub-tree which avoids the fault, wherein the communications network is configured to provide an E-tree service to at least part of the nodes of the communications network, wherein the ingress node is a node responsible for distribution of the E-tree service within the communications network and the egress nodes are nodes attached to destinations of the E-tree service.

17. The node as claimed in claim 16, wherein if the processor determines that the node is capable of causing traffic to be switched to another sub-tree, then the processor is configured to cause the fault notification signal not to be sent.

18. The first node of claim 16, wherein switching traffic to an alternative sub-tree which avoids the fault comprises switching traffic destined for a first leaf node to be sent over a first link to a second leaf node, which in turn causes the traffic to be sent over a second link to the first leaf node.

* * * * *